UNITED STATES PATENT OFFICE.

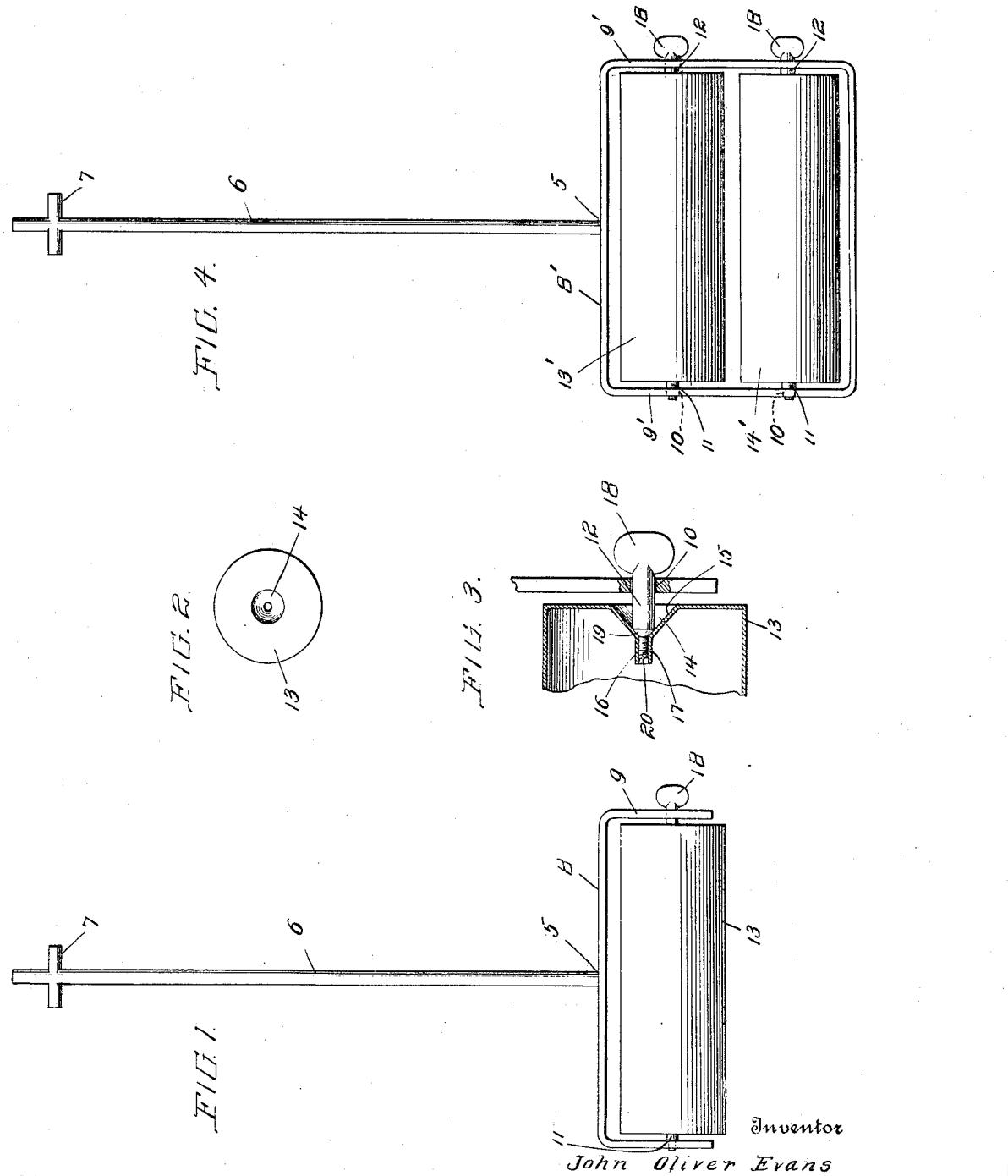

JOHN OLIVER EVANS, OF RUMSEY, CALIFORNIA.

BED-WARMER.

1,197,467.    Specification of Letters Patent.    Patented Sept. 5, 1916.

Application filed May 4, 1915. Serial No. 25,771.

*To all whom it may concern:*

Be it known that I, JOHN OLIVER EVANS, a citizen of the United States, residing at Rumsey, in the county of Yolo and State of California, have invented new and useful Improvements in Bed-Warmers, of which the following is a specification.

The present invention has relation to a portable heater especially adapted for warming beds, couches and the like, and the object thereof is to provide an apparatus of this character which may be conveniently handled and conveyed over the bed, couch and the like for properly warming the same.

The primary object of this invention is the provision of a device of the above stated character, wherein the cylinder containing the heating fluid is so mounted with respect to its conveying frame, whereby the cylinder may be easily and readily operated upon the bed when it is desired to warm the same.

A still further object of the invention is the provision of a heating cylinder formed at one end with a filling opening which facilitates the filling of the cylinder with the heating fluid.

The invention further consists in providing means for journaling the heating cylinder to its conveying frame, whereby the said means will also serve as a closure for the cylinder.

The invention further consists in forming the detachable bearing with a beveled end adapted to engage with the walls of the filling opening of the heating cylinder for establishing a liquid tight closure.

The invention consists in the novel features, details of construction and combination of parts which will hereinafter be more fully set forth, illustrated in the accompanying drawing and pointed out in the appended claim.

In the accompanying drawing:—Figure 1 is a top plan view illustrating the heating cylinder mounted in the frame. Fig. 2 is an end elevation of the cylinder clearly illustrating the filling opening. Fig. 3 is a detail section taken through the filling opening of the heating cylinder and illustrating the detachable bearing connected thereto. Fig. 4 is a top plan view of a slight modified form.

Referring more particularly to the drawing Fig. 4 is a top plan view of a slightly modi- any suitable material, such as wood, aluminum and the like and comprising a handle 6 formed at one end with a hand gripping member 7, and at its opposite end with an inverted U-shaped hanger 8. The branches or limbs 9 of the hanger are provided with horizontally alined apertures 10 for receiving the fixed trunnion 11, and the detachable trunnion 12 of the heating cylinder 13, for rotatably mounting the heating cylinder 13 within the hanger 9. The heating cylinder 13 is preferably made of aluminum or other light material and is adapted to contain therein a quantity of hot water, whereby the cylinder is heated to a predetermined degree and making the same perfectly safe when using such on the bed.

The cylinder 13 is formed at one end with a funnel-shaped filling opening 14, presenting flared walls 15, the lower extremities of said walls gradually merging into the cylindrical neck 16 of said cylinder, said neck being formed with an internally threaded portion 17.

The detachable trunnion or bearing 12 is formed at its outer end with a winged manipulating portion 18. The opposite or inner end of said trunnion is formed with a beveled face 19 and a reduced externally threaded connecting stem 20. The connecting portion 20 of the detachable trunnion or bearing engages the internally threaded portion 17 of the neck 16 of the cylinder for detachably connecting the trunnion in the filling opening 14 of said heating cylinder, thereby utilizing the trunnion as a closure or plug for closing the filling opening of the cylinder, and preventing the leakage of the fluid therefrom. It will be readily understood, when it is desired to use the device for the warming of the bed, the heating cylinder, through the medium of its funnel-shaped filling opening, is readily filled with hot water, or the like, and the hanger is thence supported on one of its branches 9, the fixed trunnion 11 of the cylinder is inserted in one of the horizontally alined apertures 10, the movable trunnion is thence inserted within and downwardly through the opposite alined aperture of the branches, and screwed in the portion 17 of the neck 16, of the heating cylinder, until its beveled face 19 snugly and tightly engages with the flared walls 15 of said filling opening, thereby establishing a liquid tight closure for the cylinder, preventing any accidental leakage thereof during the operation of the device on the bed, and further supporting the cylinder in its hanger 8 for a free rotative movement.

In Fig. 4 of the drawing is illustrated a slight modification which includes extending the length of the branches 9' of the hanger 8', to receive a plurality of heating cylinders, 13' and 14'. This form of warmer is used where it is required to increase the heating surfaces. The cylinders 13' and 14' are identical in all respects to the form of cylinder disclosed in Figs. 1 to 3 inclusive of the drawing, and the manner of mounting the same is also identical with such disclosures, therefore a further description of this modification is not believed to be necessary.

From the foregoing description, taken in connection with the accompanying drawing, the advantages of construction and of the method of operation will be readily apparent to those skilled in the art to which the invention relates. While I have described the principles of operation of the device together with the device which I now consider to be the best embodiment thereof, I desire to have it understood that the device shown is merely illustrative and that such changes may be made when desired as are within the scope of the claim appended thereto.

What is claimed as new is:—

A bed warmer comprising a frame, a heating cylinder carried by said frame and formed with a funnel-shaped filling opening presenting flared walls, the contracted end of the funnel-shaped opening terminating in an internally threaded cylindrical neck, means for detachably connecting the heating cylinder with said frame, said means including a detachable trunnion having a threaded stem and a beveled portion, the threaded stem of the detachable trunnion threadedly engaging with the cylindrical neck of the funnel-shaped filling opening and the beveled portion thereof engaging with the flared walls of such opening, whereby establishing a liquid-tight connection between the detachable trunnion and said cylinder substantially as and for the purpose specified.

In testimony whereof I affix my signature in presence of two witnesses.

JOHN OLIVER EVANS.

Witnesses:
   Jno. Q. Riordan,
   A. W. McCarthy.